(12) United States Patent
Wada

(10) Patent No.: US 11,300,459 B2
(45) Date of Patent: Apr. 12, 2022

(54) CAPACITIVE TEMPERATURE SENSOR

(71) Applicant: ALPS ALPINE CO., LTD., Tokyo (JP)

(72) Inventor: Suguru Wada, Santa Clara, CA (US)

(73) Assignee: ALPS ALPINE CO., LTD., Tokyo (JP)

( * ) Notice: Subject to any disclaimer, the term of this patent is extended or adjusted under 35 U.S.C. 154(b) by 205 days.

(21) Appl. No.: 16/743,463

(22) Filed: Jan. 15, 2020

(65) Prior Publication Data
US 2020/0149978 A1   May 14, 2020

Related U.S. Application Data

(63) Continuation of application No. PCT/JP2018/017896, filed on May 9, 2018.

(60) Provisional application No. 62/534,745, filed on Jul. 20, 2017.

(51) Int. Cl.
*G01K 7/00* (2006.01)
*G01K 7/34* (2006.01)

(52) U.S. Cl.
CPC ....................... *G01K 7/34* (2013.01)

(58) Field of Classification Search
CPC combination set(s) only.
See application file for complete search history.

(56) References Cited

U.S. PATENT DOCUMENTS

| | | | |
|---|---|---|---|
| 5,021,795 A * | 6/1991 | Masiulis | H01Q 9/0442 343/700 MS |
| 5,553,495 A * | 9/1996 | Paukkunen | G01D 5/2405 29/25.42 |
| 6,359,444 B1 * | 3/2002 | Grimes | G01N 22/00 324/633 |
| 9,702,766 B2 * | 7/2017 | Aliane | G01K 7/343 |
| 2010/0033437 A1 | 2/2010 | Matsubara | |
| 2014/0321507 A1 * | 10/2014 | Aliane | G01K 7/343 374/184 |
| 2016/0253035 A1 * | 9/2016 | Mitamura | G06F 3/0445 345/174 |

FOREIGN PATENT DOCUMENTS

| | | |
|---|---|---|
| JP | 2002-111087 | 4/2002 |
| JP | 2005-172839 | 6/2005 |

(Continued)

OTHER PUBLICATIONS

International Search Report dated Aug. 7, 2018 in PCT/JP2018/017896 filed on May 9, 2018.

*Primary Examiner* — Lisa M Caputo
*Assistant Examiner* — Nasir U. Ahmed
(74) *Attorney, Agent, or Firm* — IPUSA, PLLC

(57) ABSTRACT

A temperature sensor includes a polymer layer, a relative permittivity of the polymer layer varying in accordance with temperature, the polymer layer being formed of a flexible material; at least one first electrode disposed on one surface of the polymer layer; at least one second electrode disposed on another surface of the polymer layer; and a measuring unit configured to measure a temperature of an object based on capacitance of at least one region between the first electrode and the second electrode that are separated by the polymer layer, the first electrode being closer than the second electrode to a surface of the object that contacts the temperature sensor.

11 Claims, 25 Drawing Sheets

(56) References Cited

FOREIGN PATENT DOCUMENTS

| | | |
|---|---|---|
| JP | 2005-233708 | 9/2005 |
| JP | 2009-192306 | 8/2009 |
| JP | 2010-210400 | 9/2010 |
| JP | 2015-507185 | 3/2015 |
| JP | 2016-091052 | 5/2016 |
| WO | WO-2015107819 A1 * | 7/2015 ............ C09J 133/08 |

* cited by examiner

FIG.6

| 19 | 19 | 19 | 19 | 18 |
|----|----|----|----|----|
| 20 | 29 | 29 | 23 | 19 |
| 20 | 31 | 36 | 24 | 19 |
| 20 | 28 | 30 | 25 | 19 |
| 19 | 20 | 20 | 20 | 19 |

FIG.7

| 18 | 18 | 18 | 18 | 18 | 18 | 18 | 18 | 18 | 17 |
|----|----|----|----|----|----|----|----|----|----|
| 18 | 22 | 20 | 20 | 20 | 20 | 20 | 18 | 19 | 18 |
| 18 | 22 | 27 | 29 | 29 | 27 | 23 | 20 | 20 | 18 |
| 18 | 23 | 26 | 34 | 33 | 28 | 26 | 23 | 20 | 18 |
| 18 | 23 | 27 | 33 | 35 | 33 | 27 | 23 | 20 | 18 |
| 18 | 23 | 28 | 35 | 41 | 34 | 25 | 22 | 20 | 18 |
| 18 | 22 | 27 | 33 | 32 | 33 | 28 | 24 | 20 | 18 |
| 18 | 22 | 27 | 27 | 27 | 27 | 27 | 23 | 20 | 18 |
| 18 | 21 | 23 | 22 | 22 | 22 | 22 | 22 | 20 | 18 |
| 18 | 18 | 18 | 18 | 18 | 18 | 18 | 18 | 18 | 18 |

FIG.19

| 0 | 0 | 10 | 0 | 0 | 0 | 0 | 0 | 0 | 0 |
|---|---|---|---|---|---|---|---|---|---|
| 0 | 30 | 60 | 30 | 0 | 0 | 0 | 0 | 0 | 0 |
| 10 | 60 | 100 | 60 | 10 | 0 | 0 | 0 | 0 | 0 |
| 0 | 30 | 60 | 30 | 0 | 0 | 0 | 0 | 0 | 0 |
| 0 | 0 | 10 | 0 | 0 | 0 | 5 | 5 | 0 | 0 |
| 0 | 0 | 0 | 0 | 0 | 5 | 30 | 30 | 5 | 0 |
| 0 | 0 | 0 | 0 | 5 | 30 | 80 | 80 | 30 | 5 |
| 0 | 0 | 0 | 0 | 5 | 30 | 80 | 80 | 30 | 5 |
| 0 | 0 | 0 | 0 | 0 | 5 | 30 | 30 | 5 | 0 |
| 0 | 0 | 0 | 0 | 0 | 0 | 5 | 5 | 0 | 0 |

CAPACITIVE TEMPERATURE SENSOR

CROSS-REFERENCE TO RELATED APPLICATION

This application is a continuation application of International Application No. PCT/JP2018/017896 filed May 9, 2018, and designated the U.S., which is based upon and claims priority to U.S. provisional Patent Application No. 62/534,745, filed Jul. 20, 2017, the entire contents of which are incorporated herein by reference.

BACKGROUND OF THE INVENTION

1. Field of the Invention

The present disclosure relates to a temperature sensor.

2. Description of the Related Art

Temperature sensors for measuring temperature are used in various fields, and there are various methods of measuring temperature. For example, for commonly used thermometers, liquid such as alcohol, oil, or mercury is used to base a change in volume of liquid due to variation in temperature. In recent years, thermometers such as thermistors have been used to base a change in electrical resistance due to variation in temperature. Some thermometers measure a temperature of an object by detecting a wavelength, intensity and the like of infrared rays emitted by the object. These thermometers are used in a manner suitable for application. See, Japanese Unexamined Patent Application Publication Nos. 2016-091052 and 2010-210400.

SUMMARY OF THE INVENTION

According to an aspect of embodiments, a temperature sensor includes a polymer layer, a relative permittivity of the polymer layer varying in accordance with temperature, the polymer layer being formed of a flexible material; at least one first electrode disposed on one surface of the polymer layer; at least one second electrode disposed on another surface of the polymer layer; and a measuring unit configured to measure a temperature of an object based on capacitance of at least one region between the first electrode and the second electrode that are separated by the polymer layer, the first electrode being closer than the second electrode to a surface of the object that contacts the temperature sensor.

BRIEF DESCRIPTION OF THE DRAWINGS

FIG. 4 is a graph illustrating relationship between a temperature and a change rate of capacitance with respect to PET, PEN, and the like;

FIG. 6 is a diagram illustrating an example of temperature distribution measured by the temperature measuring device according to the first embodiment;

FIG. 7 is a diagram illustrating an example of temperature distribution measured by another temperature measuring device according to the first embodiment;

FIG. 19 is a diagram illustrating an example of temperature distribution measured by the temperature measuring device according to the third embodiment.

DESCRIPTION OF THE PREFERRED EMBODIMENTS

Figure 1:
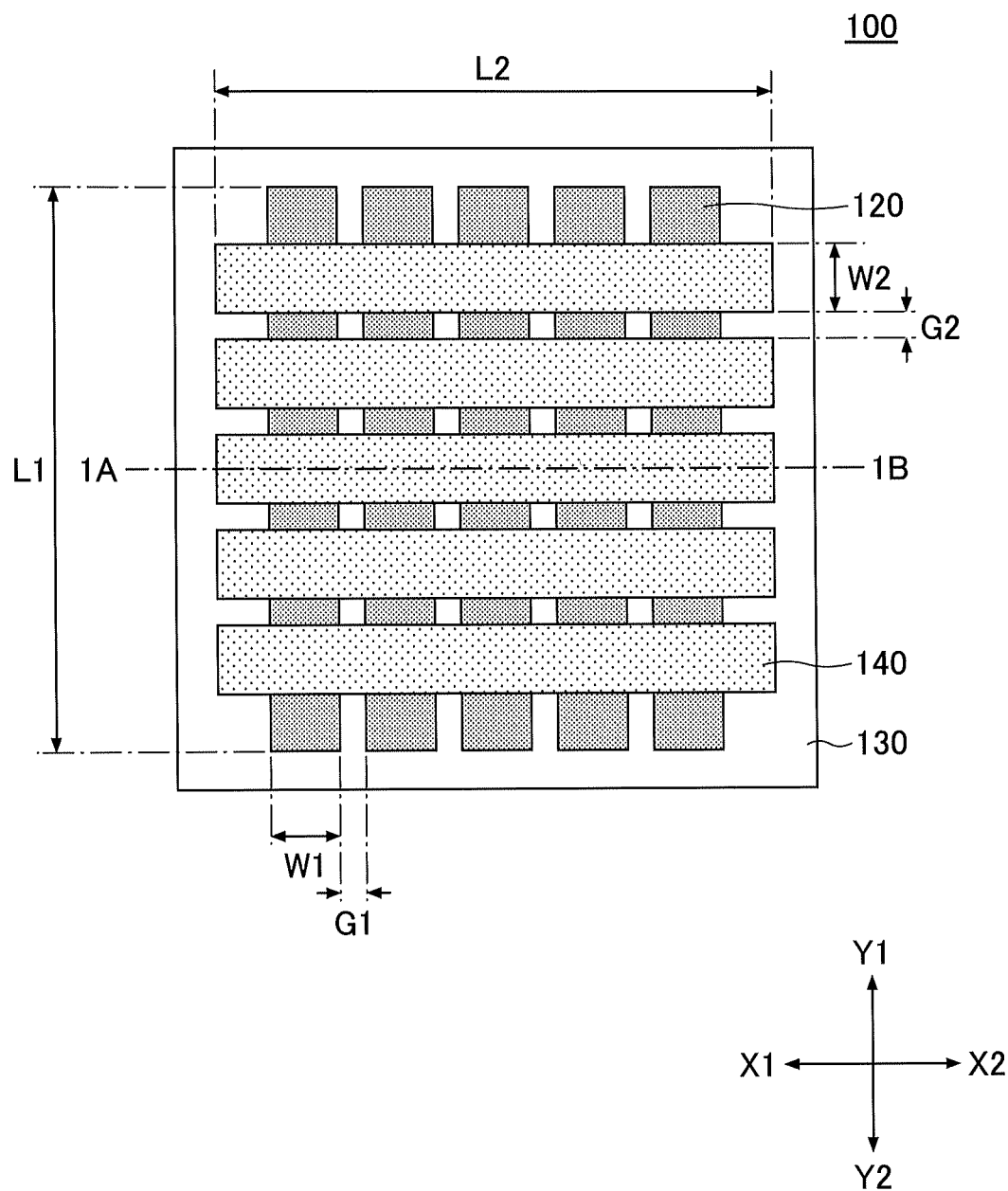
FIG. 1 is a diagram illustrating an example of a temperature sensor according to a first embodiment.

Some thermometers include temperature sensors for measuring temperature of a surface of an object. The present disclosure provides a temperature sensor so as to operate easily, decrease the size, and reduce costs.

Embodiments will be hereinafter described with reference to the drawings. Note that the same reference numerals are used to denote same components or the like; accordingly, for the same components or the like, explanation may be omitted. In the following description, an X1-X2 direction, a Y1-Y2 direction, and a Z1-Z2 direction are mutually orthogonal. A plane including the X1-X2 direction and the Y1-Y2 direction refers to an XY plane, a plane including the Y1-Y2 direction and the Z1-Z2 direction refers to a YZ plane, and a plane including the Z1-Z2 direction and the X1-X2 direction refers to a ZX plane.

First Embodiment

Figure 2:
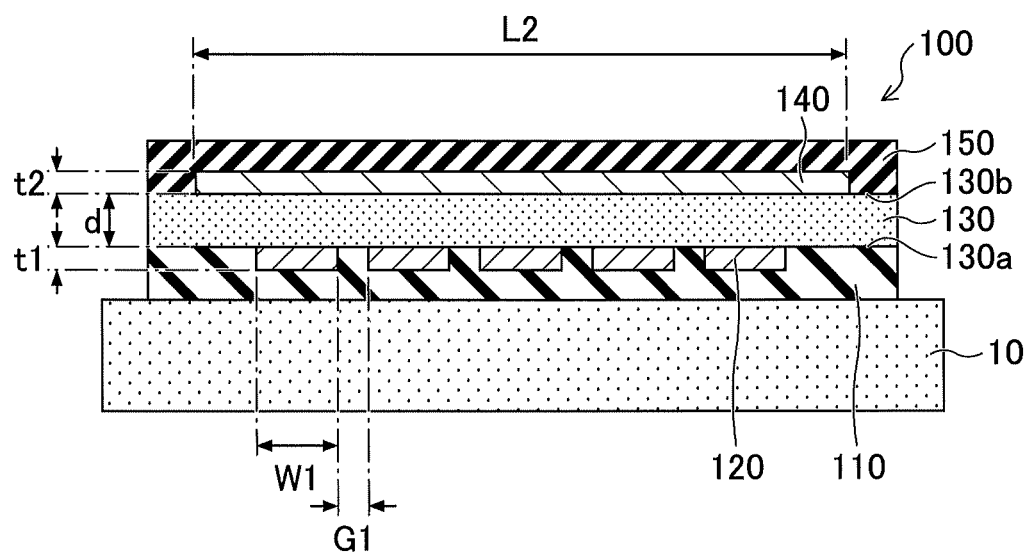
FIG. 2 is a cross-sectional view of the temperature sensor according to the first embodiment.
Figure 2:
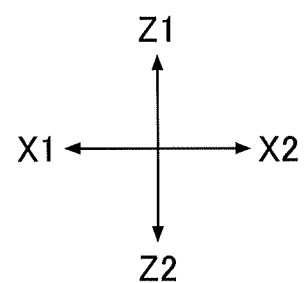

A temperature sensor according to a first embodiment will be described with reference to FIGS. 1 and 2. FIG. 1 is a top view of electrode arrangement of a temperature sensor 100 according to the present embodiment. FIG. 2 is a cross-sectional view of the temperature sensor 100 taken along the dashed-dotted line 1A-1B in FIG. 1. In the present embodiment, the temperature sensor 100 measures a temperature of a surface of an object 10 to be measured. The temperature sensor 100 includes a first insulating layer 110; first electrodes 120; a polymer layer 130; second electrodes 140; a second insulating layer 150; and the like, each of which is laminated toward a Z1 direction from a Z2 direction.

A plurality of first electrodes 120 are disposed on one surface 130a of the polymer layer 130. Each first electrode 120 is formed by a film that includes a conductive metal material such as copper (Cu), silver (Ag), or ITO (Indium Tin Oxide). Each first electrode 120 extends in a Y1-Y2 direction, and has a width W1 of about 5 mm; a length L1 of about 30 mm; and a thickness t1 in a range of from 8 μm to 16 μm, for example. Spacing G1 between adjacent first electrodes 120 is set to about 60 μm.

A plurality of second electrodes 140 are disposed on the other surface 130b of the polymer layer 130. Each second electrode 140 is formed by a film that includes a conductive metal material such as copper, silver, or ITO. Each second electrode 140 extends in an X1-X2 direction, and has a width W2 of about 5 mm; a length L2 of about 30 mm; and a thickness t2 in a range of from 8 μm to 16 μm, for example. Spacing G2 between adjacent second electrodes 140 is set to about 60 μm.

In such a manner, a direction in which the first electrodes 120 extend is perpendicular to a direction in which second electrodes 140 extend. In the following, spacing between adjacent first electrodes 120 may be referred to as spacing between electrodes indicating first electrodes 120, and spacing between adjacent second electrodes 140 may be referred to as spacing between electrodes indicating second electrodes 140. With respect to the temperature sensor as illustrated in FIGS. 1, 2, and the like, the number of disposed first electrodes 120 is 5, and the number of disposed second electrodes 140 is 5.

The first insulating layer 110 is formed of a flexible insulating resin material, so as to cover the first electrodes 120 that are disposed on the surface 130a of the polymer layer 130. The first insulating layer 110 is formed of polyimide or the like to have a thickness of 40 μm, for example.

The second insulating layer 150 is formed of a flexible insulating resin material, so as to cover the second electrodes 140 that are disposed on the surface 130b of the polymer layer 130. The second insulating layer 150 is formed of polyimide or the like to have a thickness of 40 μm, for example.

Figure 3:
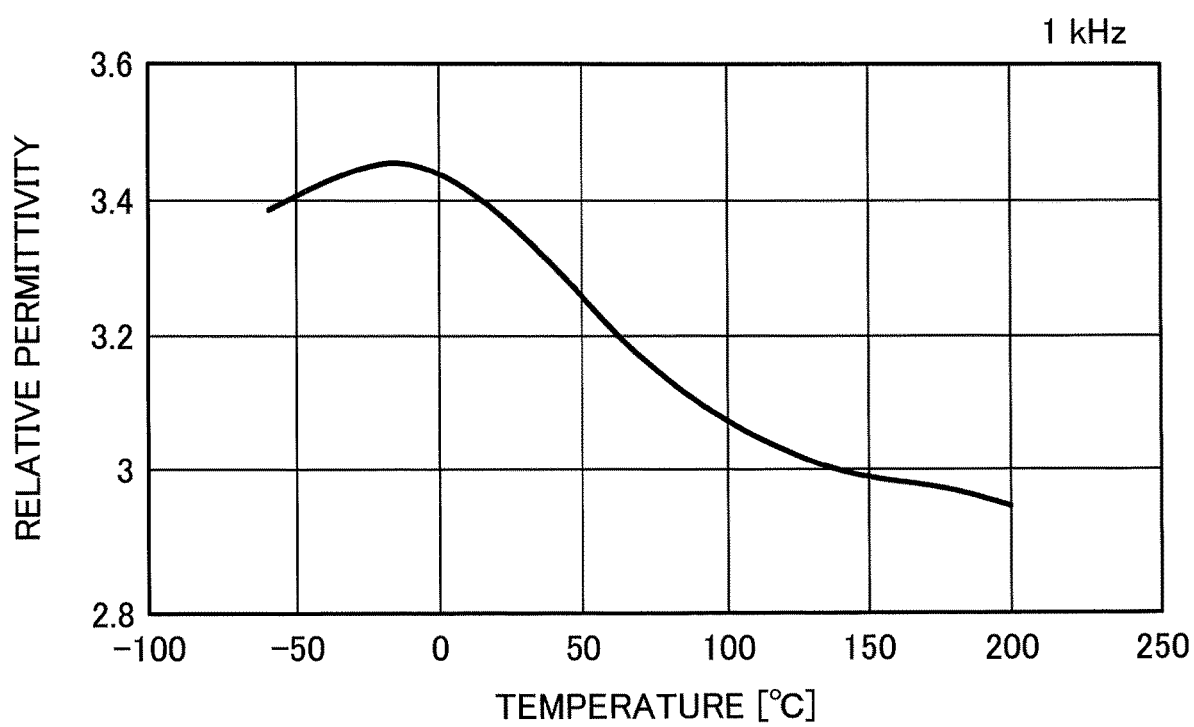
FIG. 3 is a graph illustrating a relationship between a temperature and a relative permittivity with respect to polyimide.

The polymer layer 130 is formed of a flexible resin material having a relative permittivity that changes in accordance with variation in temperature. For example, the polymer layer 130 is formed of polyimide or the like to have a thickness d of 50 μm or smaller. FIG. 3 is a graph illustrating a relationship between a temperature and a relative permittivity for polyimide in a case of an alternating voltage being applied at frequencies of 1 kHz. As illustrated in FIG. 3, a relative permittivity indicates about 3.45 at a temperature of −15 degrees C. A relative permittivity gradually decreases as temperature rises. A relative permittivity indicates about 2.95 at a temperature of 200 degrees C.

For illustrative purposes, a range of from 20 to 100 degrees C., in which the linearity of the temperature and a relative permittivity relationship is relatively favorable, will be hereafter described. In a range of from 20 to 100 degrees C., a relationship between a temperature and a relative permittivity is considered to be linear. In FIG. 3, when a relative permittivity indicates about 3.4 at a temperature of 20 degrees C.; and a relative permittivity indicates about 3.1 at a temperature of 100 degrees C., a relative permittivity P is expressed by Equation (1) below. Where, T indicates a temperature. The temperature may be approximated instead of a linear approximation as expressed in Equation (1) below. For example, a relationship table with respect to each value is preliminarily stored, and a given temperature may be determined from the relationship table.

$$P = -0.00375 \times T + 3.475 \quad (1)$$

Table 1 below shows a relationship between a temperature and a relative permittivity, which is determined from Equation (1) above.

TABLE 1

| | TEMPERATURE (° C.) | | | | | | | | |
|---|---|---|---|---|---|---|---|---|---|
| | 20 | 30 | 40 | 50 | 60 | 70 | 80 | 90 | 100 |
| RELATIVE PERMITTIVITY | 3.4 | 3.3625 | 3.325 | 3.2875 | 3.25 | 3.2125 | 3.175 | 3.1375 | 3.1 |

For consideration, capacitance of a region between a given first electrode 120 and a given second electrode 140 that are separated by the polymer layer 130 will be described. In this case, in a plan view, in each region in which a given first electrode 120 having a width W1 and a given second electrode 140 having a width W2 overlap each other; and in which the given first electrode 120 and given second electrode 140 intersect, when a parallel-plate capacitor is considered to be formed at each intersection of first and second electrodes, each plate of the parallel-plate capacitor has an area of $2.5 \times 10^{-5}$ m². Note that in FIGS. 1 and 2, the total number of parallel-plate capacitors is 25, where the number of first electrodes is 5; and the number of second electrodes is 5.

In a plan view, at each intersection of first and second electrodes, capacitance C is expressed by Equation (2) below. Where a permittivity $\varepsilon_0$ of vacuum is $8.85 \times 10^{12}$.

$$C = P \times \varepsilon_0 \times S/d \quad (2)$$

Table 2 shows a relationship between a temperature and capacitance in a case where the polymer layer 130 has a thickness d of 12.5 μm ($1.25 \times 10^{-5}$ m).

TABLE 2

| | TEMPERATURE (° C.) | | | | | | | | |
|---|---|---|---|---|---|---|---|---|---|
| | 20 | 30 | 40 | 50 | 60 | 70 | 80 | 90 | 100 |
| CAPACITANCE (pF) | 60.18 | 59.52 | 58.85 | 58.19 | 57.53 | 56.86 | 56.20 | 55.53 | 54.87 |
| CHANGE AMOUNT FOR 10° C. TEMPERATURE INCREASE (pF) | | −0.66 | −0.67 | −0.66 | −0.66 | −0.67 | −0.66 | −0.67 | −0.66 |

As shown in Table 2, in this case, a change amount of capacitance C for a 10° C. temperature increase indicates about 0.66 pF (660 fF). From this, a change amount of capacitance for a 1° C. temperature increase indicates about 66 fF. From the viewpoint of a current situation where a capacitance measuring device has resolution of 10 fF or more, temperature resolution is about 0.15 degrees C.

Table 3 shows a relationship between a temperature and capacitance in a case where the polymer layer 130 has a thickness d of 25 μm (2.5×10$^{-5}$ m).

TABLE 3

| | TEMPERATURE (° C.) | | | | | | | | |
|---|---|---|---|---|---|---|---|---|---|
| | 20 | 30 | 40 | 50 | 60 | 70 | 80 | 90 | 100 |
| CAPACITANCE (pF) | 30.09 | 29.76 | 29.43 | 29.09 | 28.76 | 28.43 | 28.10 | 27.77 | 27.44 |
| CHANGE AMOUNT FOR 10° C. TEMPERATURE INCREASE (pF) | | −0.33 | −0.33 | −0.34 | −0.33 | −0.33 | −0.33 | −0.33 | −0.33 |

As shown in Table 3, in this case, a change amount of capacitance C for a 10° C. temperature increase indicates about 0.33 pF (330 fF). From this, a change amount of capacitance C for a 1° C. temperature increase indicates about 33 fF. By taking into account a capacitance measuring device that has the same resolution as that described above, temperature resolution is about 0.3 degrees C.

In such a manner, when a polymer layer 130 has a thickness d of 50 μm, temperature resolution is about 0.6 degrees C. When a polymer layer 130 has a thickness d of 75 μm, temperature resolution is about 0.9 degrees C. If temperature resolution is about 1 degrees C., a polymer layer 130 may have a thickness d of 75 μm. In practice, a polymer layer 130 may have a thickness d of 50 μm or smaller, which allows for temperature resolution of about 0.6 degrees C. or less.

Figure 4:
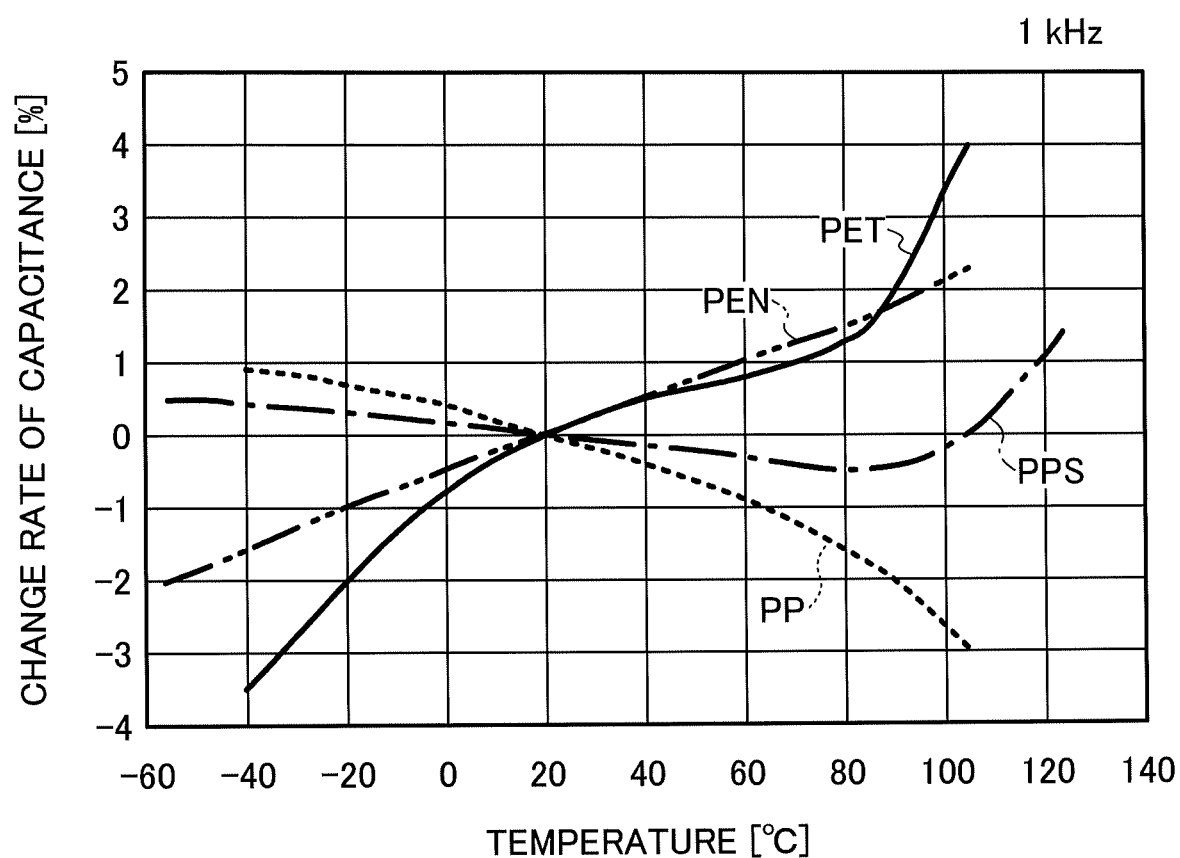

With respect to the temperature sensor according to the present embodiment, instead of polyimide, the polymer layer 130 can be formed of polyethylene terephthalate (PET), polyethylene naphthalate (PEN), and the like, as illustrated in FIG. 4. FIG. 4 is a graph illustrating a relationship between a temperature and a change rate of capacitance measured in a case of an alternating voltage being applied at frequencies of 1 kHz, with respect to PET, PEN, PP (Polypropylene), and PPS (Poly Phenylene Sulfide).

(Temperature Measuring Device)

Hereafter, the temperature measuring device using a temperature sensor according to the present embodiment will be described with reference to FIG. 5. In the present embodiment, a temperature sensor 100 performs measurement in which a surface of an object 10 to be measured contacts the first electrode 120 side. Note that in FIG. 5, for illustrative purposes, a polymer layer 130, a first insulating layer 110, and a second insulating layer 150 are not illustrated. However, in the measurement, the first insulating layer 110 contacts with the surface of the object 10. With respect to the temperature sensor 100 according to the present embodiment, the polymer layer 130; the first insulating layer 110; the second insulating layer 150; and the like are each famed of a flexible material, and each of the first electrodes 120 and the second electrodes 140 is formed in a film shape and is extremely thin. In such a manner, even when an object 10 has a curved surface or the like, other than a flat surface, the temperature sensor 100 can be deformed in accordance with a surface shape of a given object 10. Thereby, even when a given object 10 has a curved surface, or the like, the surface of the object 10 can be closely contacted. Accordingly, temperature of a surface of a given object 10 can be accurately measured.

Figure 5:
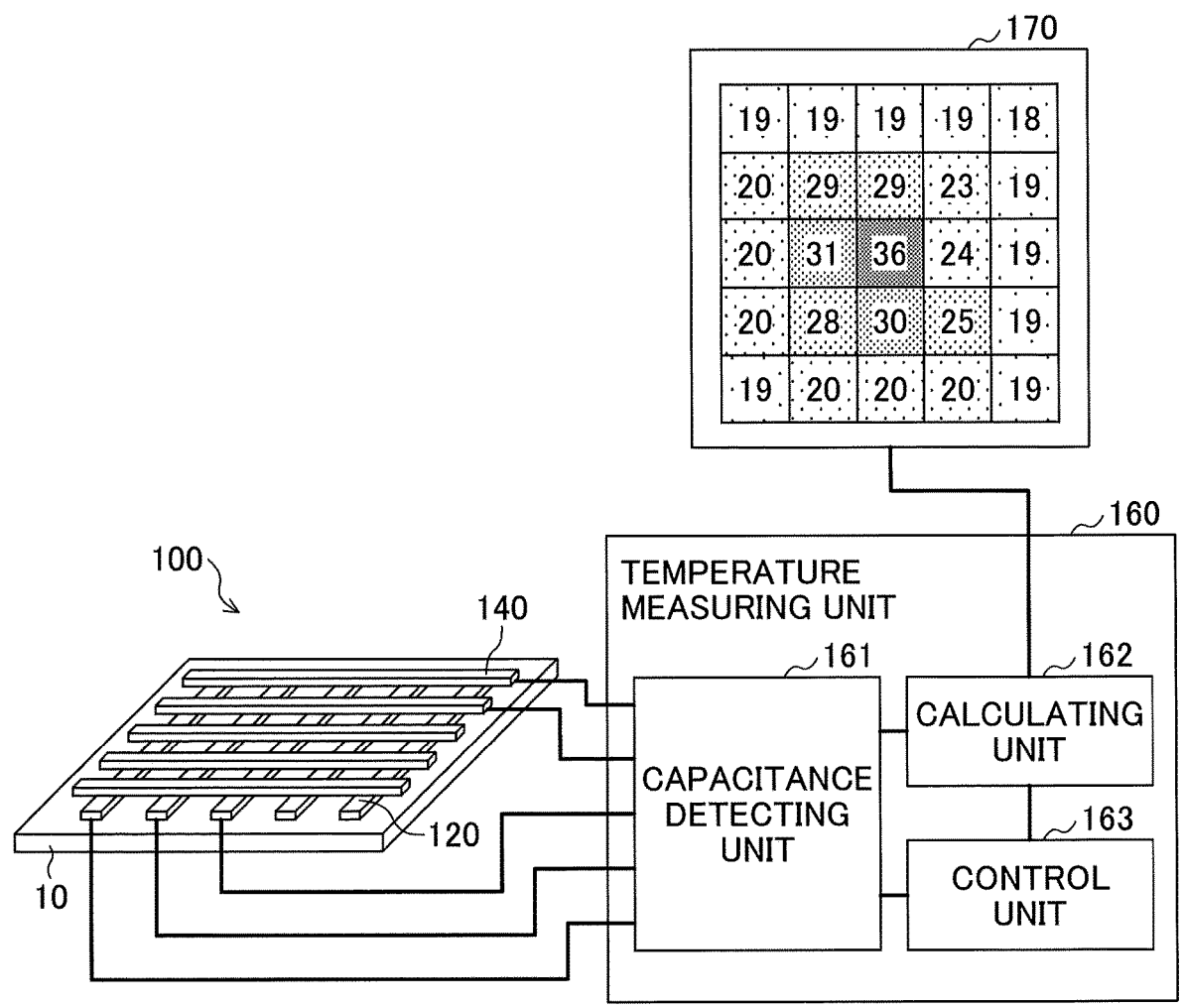
FIG. 5 is a diagram illustrating an example of a configuration of a temperature measuring device according to the first embodiment.

In the present embodiment, as illustrated in FIG. 5, the temperature measuring device includes the temperature sensor 100, a temperature measuring unit 160, a display unit 170, and the like. The temperature measuring unit 160 includes a capacitance detecting unit 161; a calculating unit 162; a control unit 163; and the like. The capacitance detecting unit 161 is connected to each of the first electrodes 120 and the second electrodes 140 of the temperature sensor 100. The capacitance detecting unit 161 scans while applying an alternating voltage, and measures capacitance between a given first electrode 120 and a given second electrode 140, in each region where the given first electrode 120 and the given second electrode 140 intersect in a plan view. An alternating voltage applied in measuring capacitance formed in each region of the temperature sensor 100, may be rated at frequencies in a range of from 1 kHz to 10 MHz.

For each region of the temperature sensor 100, based on a detected capacitance value which is detected by the capacitance detecting unit 161, the calculating unit 162 calculates a temperature of each region. The control unit 163 performs controlling of the capacitance detecting unit 161 and the calculating unit 162, etc. The display unit 170 is a display or the like capable of displaying a two-dimensional image. The display unit 170 can display, as a two-dimensional image, information of temperature distribution obtained by the calculating unit 162, with respect to regions of the temperature sensor 100.

FIG. 6 illustrates a state in which the display unit 170 displays, as a two-dimensional image, temperature distribution measured by the temperature sensor 100 according to the present embodiment. In FIG. 6, the two-dimensional image of temperature distribution obtained by the temperature sensor is illustrated where the number of first electrodes 120 is 5; and the number of second electrodes 140 is 5. When the number of first electrodes 120 and second electrodes 140 increases, information of two-dimensional temperature distribution can be obtained in further detail. FIG. 7 illustrates a two-dimensional image of temperature distribution obtained by a temperature sensor in which the number of first electrodes 120 is 10; and the number of second electrodes 140 is 10.

In the temperature sensor according to the present embodiment, each of the first electrodes 120 and the second electrodes 140 may be formed of ITO or the like. The polymer layer 130; the first insulating layer 110; the second insulating layer 150; and the like may be each formed of a light-transmissive material. In this case, a surface of an object 10 can be visualized through a temperature sensor, and thus the temperature sensor can be easily set at a desired location where temperature of a surface of the object 10 is to be measured.

(Thermal conduction of temperature sensor) In the present embodiment, the temperature sensor measures temperature of an object 10 when the first insulating layer 110 contacts with a surface of the object 10. In such a manner, the first insulating layer 110 between the first electrodes 120 and the object 10 may be formed of a material having high thermal conductivity. Additionally, the second insulating layer 150 may be formed of a material having low thermal conductivity in order to avoid the effect of external heat. In the present embodiment, the first insulating layer 110 may be formed of a material having a thermal conductivity greater than that of the second insulating layer 150.

Examples of materials having flexibility and high thermal conductivity, include heat-dissipating silicone rubber (a thermal conductivity of between 1 and 3 W/m·K); double-sided adhesive tape that is thermally conductive (double-sided acrylic adhesive tape that is thermally conductive: a thermal conductivity of 0.53 W/m·K); and the like. Further, examples of materials having flexibility and low thermal conductivity, include materials containing air, such as acrylic foam or foamed plastic. Note that polyimide has a thermal conductivity of about 0.16 W/m·K; PET has a thermal conductivity of about 0.14 W/m·K; and PEN has a thermal conductivity of about 0.15 W/m·K.

In the present embodiment, each of the first electrodes 120 and the second electrodes 140 is formed of copper having a thermal conductivity of 398 W/m·K. The polymer layer 130 is formed of polyimide having a thermal conductivity of 0.16 W/m·K. In such a manner, with respect to each of the first electrodes 120 and the second electrodes 140, a thermal conductivity is 2,000 times or more the thermal conductivity of the polymer layer 130.

In order to be possibly able to avoid the effect of thermal interference between electrodes used in measuring capacitance, i.e., thermal influence caused by one or more regions adjacent to a target region, spacing G1 between first electrodes 120; and spacing G2 between second electrodes 140 may be each greater than a thickness d of the polymer layer 130. This is because, if each of spacing G1 between first electrodes 120 and spacing G2 between second electrodes 140 is smaller than a thickness d of the polymer layer 130, heat received from one or more adjacent regions has a great influence and thus temperature of each region, i.e., temperature distribution for regions is not able to be accurately measured.

With respect to a through-plane direction (Z1-Z2 direction), the first insulating layer 110 may be formed of a material that has a thermal conductivity greater than that with respect to an in-plane direction (direction parallel to an XY plane). Note that the in-plane direction refers to a direction perpendicular to the through-plane direction. In such a manner, thermal interference from adjacent regions with respect to an in-plane direction can be suppressed, and heat-transfer paths can be separately formed in respective regions. The material described above is also referred to as an anisotropically thermal conductive material, and is used in a thermal conductive sheet containing vertically oriented graphite, and in an anisotropically thermal conductive sheet formed by controlling a structure of an organic polymer. The first insulating layer 110 may have a through-plane thermal conductivity greater than a through-plane thermal conductivity of the second insulating layer 150.

Figure 8:
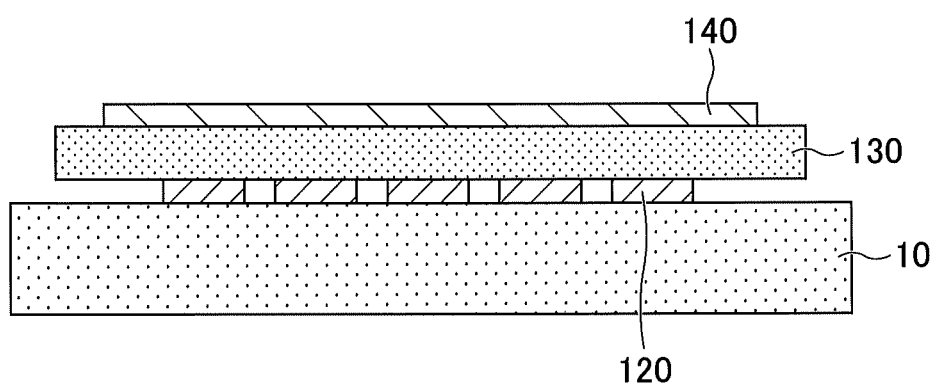
FIG. 8 is a cross-sectional view (1) of a temperature sensor in a first modification of the first embodiment.
Figure 8:
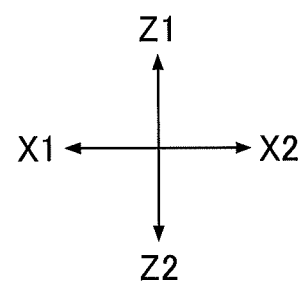

In the present embodiment, a temperature sensor may not include a first insulating layer 110 when an object 10 has an insulating surface. Additionally, a second insulating layer 150 may not be disposed when second electrodes 140 are not assumed to contact metal or the like. As an example, as illustrated in FIG. 8, a temperature sensor in a first modification of the first embodiment includes first electrodes 120, a polymer layer 130, and second electrodes 140. In this case, one or more first electrodes 120 contact with a surface of an object 10 to be measured.

(Adhesive Layer)

Figure 9:
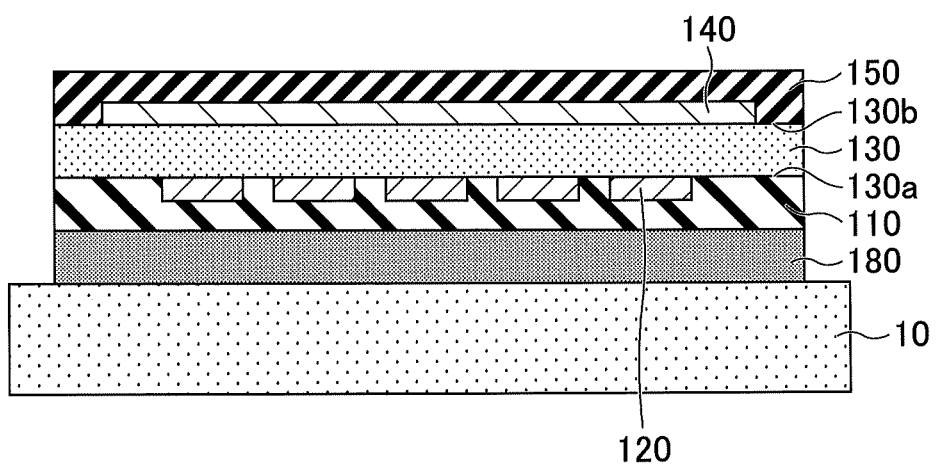
FIG. 9 is a cross-sectional view (2) of a temperature sensor in a second modification of the first embodiment.
Figure 9:
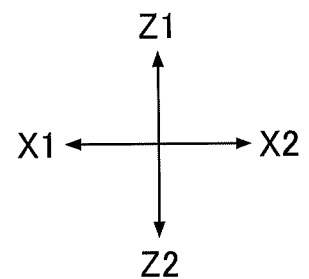

With respect to a temperature sensor in a second modification of the first embodiment, as illustrated in FIG. 9, an adhesive layer 180 for close contact with a surface of an object 10 is disposed on a surface of a first insulating layer 110, e.g., a surface of the first insulating layer 110 toward the object 10. With such an adhesive layer 180 being disposed, the temperature sensor can closely contact with the surface of the object 10. Thereby, temperature of each region can be accurately measured. If there is a gap between a first insulating layer 110 and a surface of an object 10, heat insulation is achieved through the air in the gap, or the like, and thus temperature of a surface of the object 10 could not be accurately measured. However, as described above, with the adhesive layer 180 being disposed on the surface of the first insulating layer 110 of the temperature sensor, the temperature sensor 100 can closely contact with the surface of a given object 10, and temperature of each region of the surface of the object 10 can be accurately measured. Note that the adhesive layer 180 may be integrated with the first insulating layer 110.

An example of the adhesive layer 180 includes acrylic-based double-sided tape, acrylic-based double-sided tape having a PET-based material, or the like. Additionally, when an adhesive layer 180 is formed of a material having high thermal conductivity, acrylic double-sided adhesive tape having a thermal conductivity in a range of from 0.4 to 1.5 W/m·K may be used.

Figure 10:
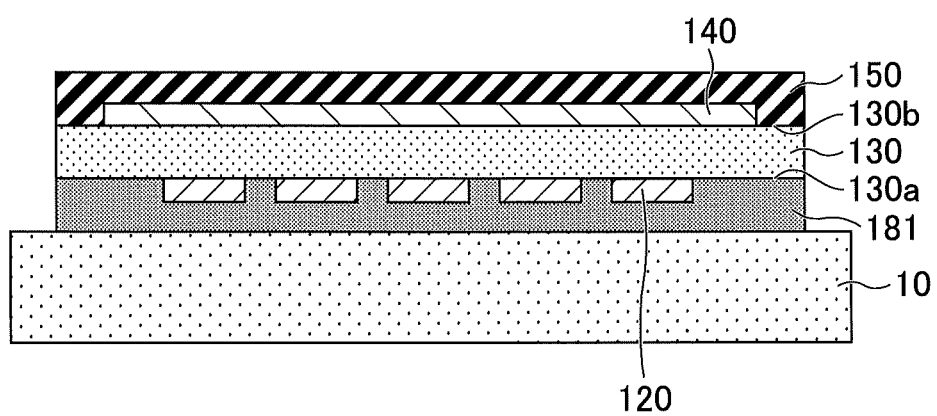
FIG. 10 is a cross-sectional view (3) of a temperature sensor in a third modification of the first embodiment.
Figure 10:
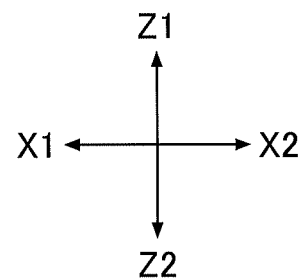

Further, as illustrated in FIG. 10, with respect to a temperature sensor in a third modification of the first embodiment, an insulating adhesive layer 181 is disposed instead of the first insulating layer 110 described above. This is because the insulating adhesive layer 181 serves as an insulator as well as allowing for close contact with a surface of an object 10.

Figure 11:
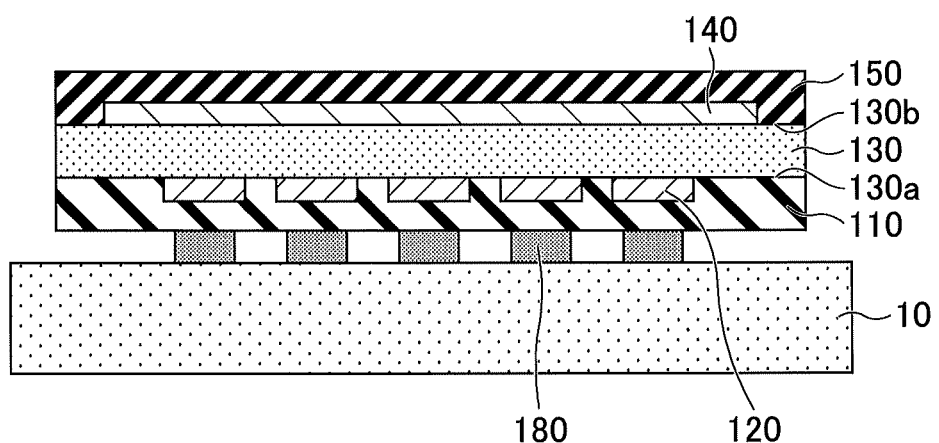
FIG. 11 is a cross-sectional view (4) of a temperature sensor in a fourth modification of the first embodiment.
Figure 11:
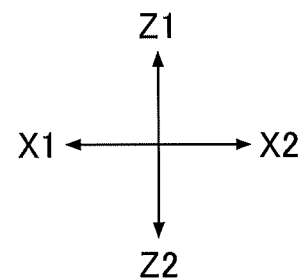

As illustrated in FIG. 11, with respect to a temperature sensor in a fourth modification of the first embodiment, the shape of each adhesive layer 180 is formed in accordance with the shape of a given first electrode 120. Additionally, the shape of each adhesive layer 180 may be formed in accordance with the shape of a given region in which a given first electrode 120 and a given second electrode 140 intersect, in a plan view. In such a manner, with the adhesive layers 180 being separately disposed, thermal interference between adjacent regions can be further prevented. This is because, when the adhesive layers 180 are separately disposed, the air is injected between adjacent adhesive layers 180 and thus thermal insulation is achieved.

Additionally, in this case, as illustrated in FIG. 11, the shape of each adhesive layer 180 is formed to have a dimension smaller than a width of each first electrode 120. Additionally, each adhesive layer 180 is formed to have dimensions smaller than a region where a given first electrode 120 and a given second electrode 140 intersect in a plan view. With each adhesive layer 180 having a dimension smaller than a first electrode 120, or the like, heat transfer to one or more adjacent regions can be suppressed. Thereby, temperature distribution can be more accurately measured.

Figure 12:
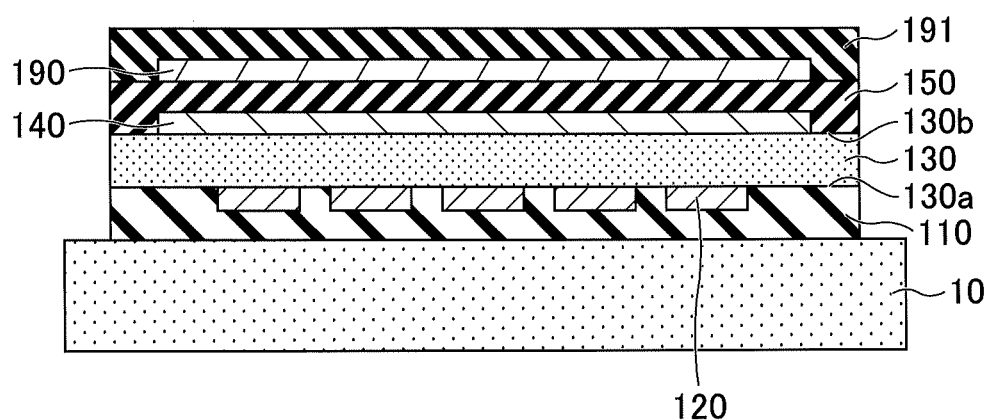
FIG. 12 is a cross-sectional view (5) of a temperature sensor in a fifth modification of the first embodiment.
Figure 12:
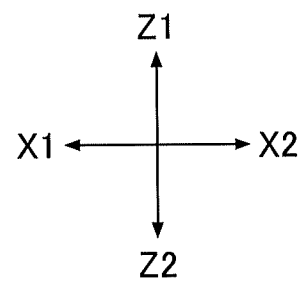

In a fifth modification of the first embodiment, as illustrated in FIG. 12, a third electrode 190 that is a shielded electrode layer is disposed on the second insulating layer 150. The third electrode 190 is formed of a material such as metal. Further, a third insulating layer 191 is disposed so as to overlay the third electrode 190. The third insulating layer 191 is formed of a flexible insulating resin material, or the like. With the third electrode 190 being disposed to approximately cover first electrodes 120 and second electrodes 140, an electric effect from the outside, e.g., an electric effect from a side of a Z1 direction, can be avoided. Thereby, temperature can be measured accurately.

In the present embodiment and modifications, a temperature sensor includes a polymer layer 130 and the like, and includes first electrodes 120 and second electrodes 140 that are disposed on both surfaces of the polymer layer 130. In such a manner, the temperature sensor can be reduced in size, as well as enabling to manufacture the temperature sensor at low cost.

Figure 13:
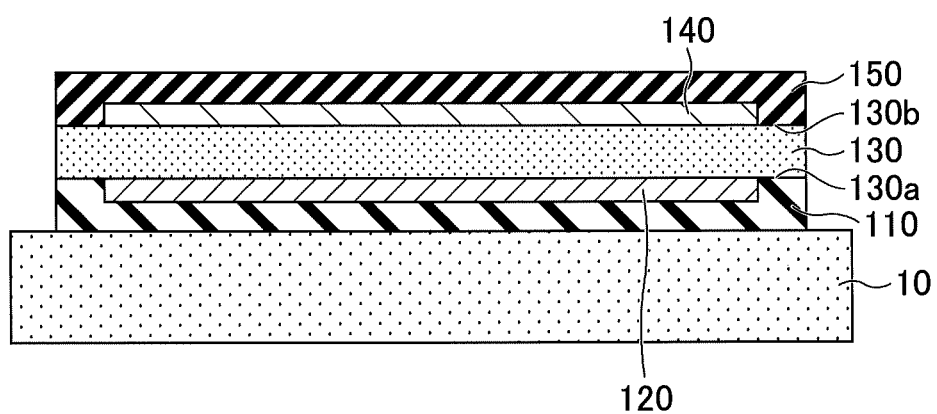
FIG. 13 is a cross-sectional view (6) of a temperature sensor in a sixth modification of the first embodiment.
Figure 13:
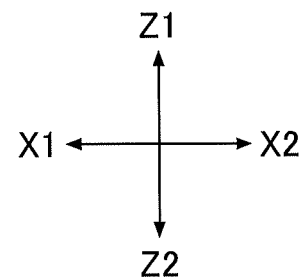

Note that, with respect to a temperature sensor in a sixth modification of the first embodiment, as illustrated in FIG. 13, one first electrode 120 and one second electrode 140 are disposed, when the temperature sensor is merely intended for a given measurement of the temperature of a surface of an object 10, instead of acquisition of temperature distribution of a surface of an object 10.

Second Embodiment

Figure 14A:
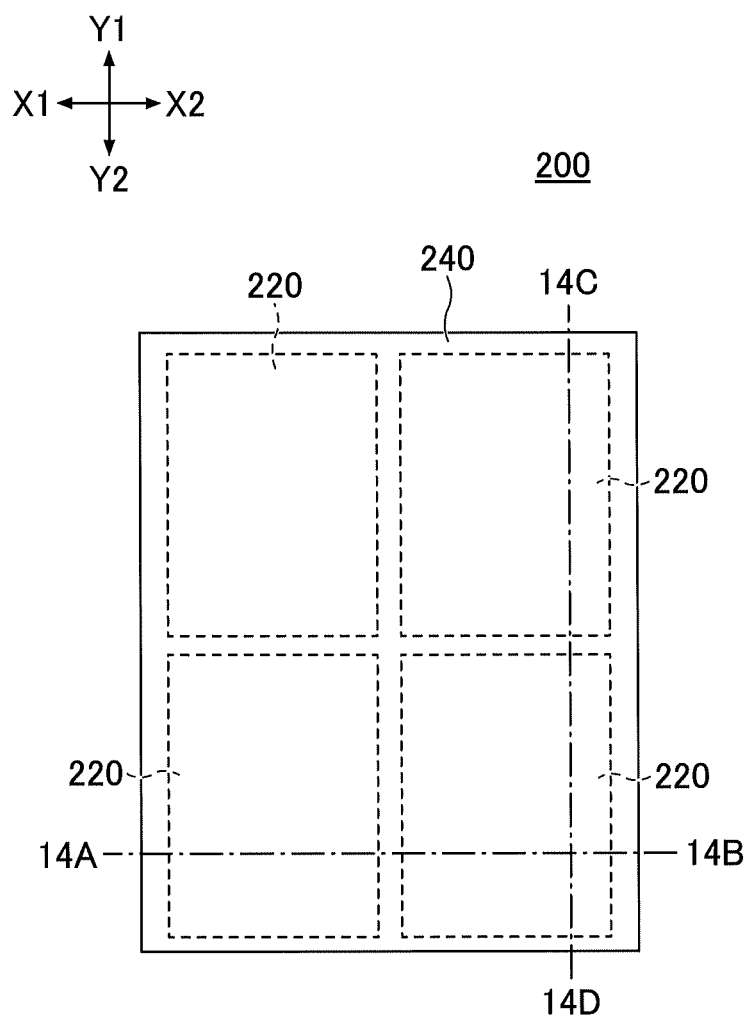
FIG. 14A is a diagram (1) illustrating an example of a temperature sensor according to a second embodiment.
Figure 14B:
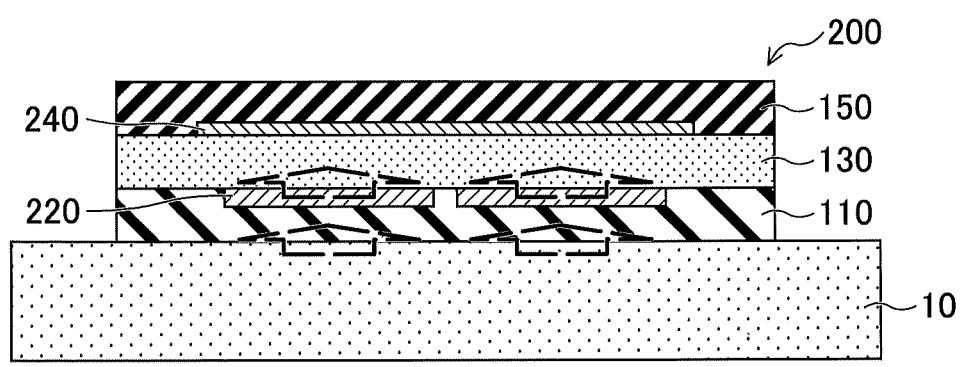
FIG. 14B is a diagram (2) illustrating an example of the temperature sensor according to the second embodiment.
Figure 14B:
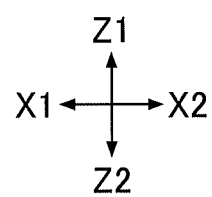
Figure 14C:
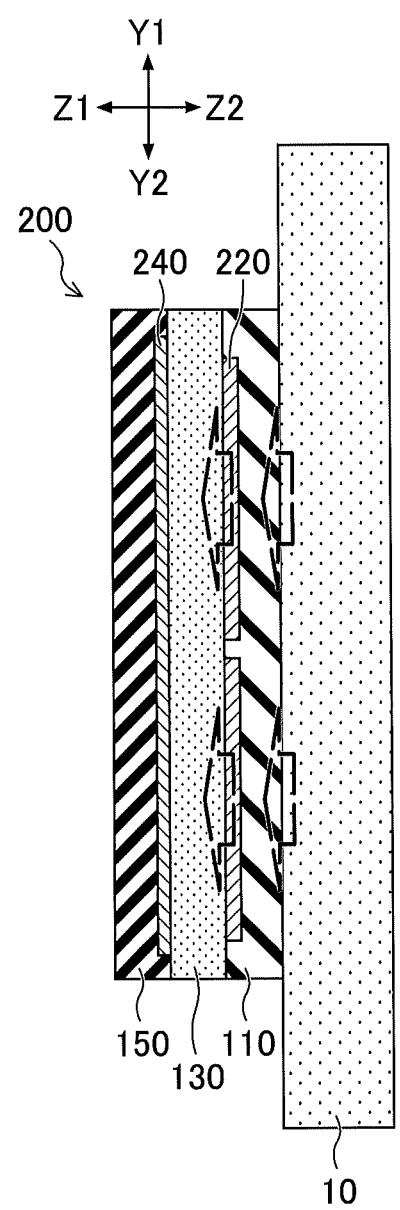
FIG. 14C is a diagram (3) illustrating an example of the temperature sensor according to the second embodiment.

Hereafter, a temperature sensor according to a second embodiment will be described. In the present embodiment, as illustrated in FIGS. 14A to 14C, a plurality of first electrodes are disposed, and a second electrode is formed as a single piece. FIG. 14A is a top view of electrode arrangement of a temperature sensor 200 according to the present embodiment. FIG. 14B is a cross-sectional view of the temperature sensor 200 taken along the dashed-dotted line 14A-14B in FIG. 14A. FIG. 14C is a cross-sectional view of the temperature sensor 200 taken along the dashed-dotted line 14C-14D in FIG. 14A.

In the present embodiment, the temperature sensor 200 measures temperature of a surface of an object 10 to be measured. The temperature sensor 200 includes a first insulating layer 110; a plurality of first electrodes 220; a polymer layer 130; a second electrode 240; a second insulating layer 150; and the like, each of which is laminated toward a Z1 direction from a Z2 direction. In the present embodiment, the first electrodes 220 and the second electrode 240 are each formed of a material or the like that is identical to the material or the like that has been described in the first embodiment and modifications.

In the present embodiment, as illustrated in FIGS. 14A to 14C, the plurality of first electrodes 220 are disposed on a proximal side of an object 10, and the second electrode 240 that is on a distant side away from the object 10 is formed so as to cover the entire first electrodes 220.

Figure 15A:
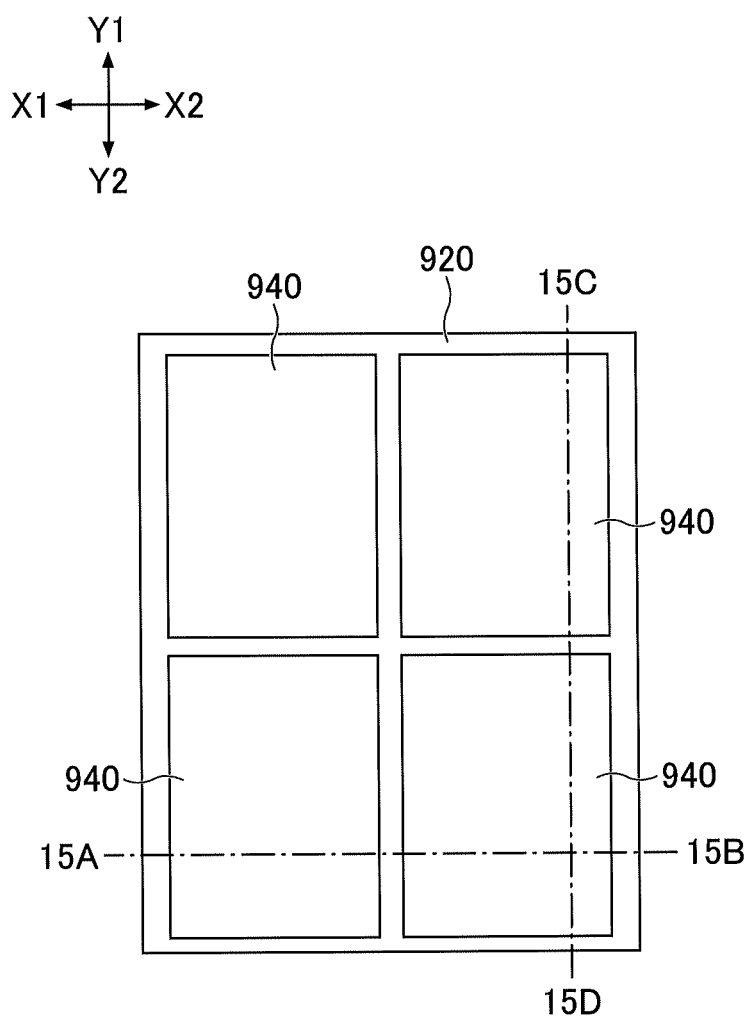
FIG. 15A is a diagram (1) illustrating a comparative temperature sensor.
Figure 15B:
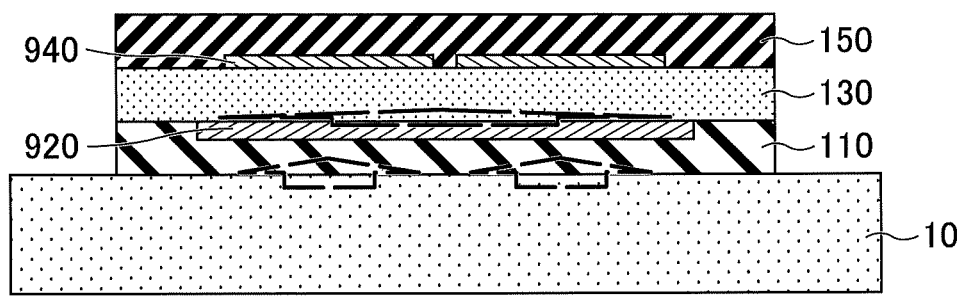
FIG. 15B is a diagram (2) illustrating the comparative temperature sensor.
Figure 15C:
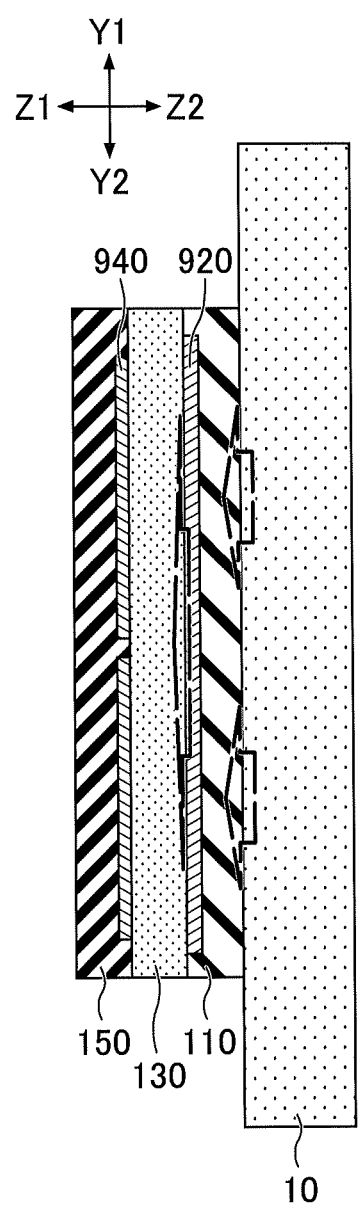
FIG. 15C is a diagram (3) illustrating the comparative temperature sensor.

Hereafter, the temperature sensor according to the present embodiment will be described using a comparative temperature sensor illustrated in FIGS. 15A to 15C. FIG. 15A is a top view of electrode arrangement of the temperature sensor. FIG. 15B is a cross-sectional view of the temperature sensor taken along the dashed-dotted line 15A-15B in FIG. 15A. FIG. 15C is a cross-sectional view of the temperature sensor taken along the dashed-dotted line 15C-15D in FIG. 15A. As illustrated in FIGS. 15A to 15C, the comparative temperature sensor includes a plurality of second electrodes 940, and one first electrode 920. The second electrodes 940 are disposed on a distant side away from an object 10, and the first electrode 920 is disposed on a proximal side of the object 10 to cover the approximately entire surface of the object.

Note that the first electrode 920 and the second electrodes 940 are each formed of copper having a thermal conductivity of 398 W/m·K. The polymer layer 130 is formed of polyimide having a thermal conductivity of 0.16 W/m·K. In such a manner, the first electrode 920 and the second electrodes 940 each have a thermal conductivity of 2000 times or more the thermal conductivity of the polymer layer 130.

In this case, in the temperature sensor as illustrated in FIGS. 15A to 15C, heat from the object 10 is transferred to the first electrode 920 via the first insulating layer 110, as indicated by dashed arrows of FIGS. 15B and 15C. The first electrode 920 is formed of copper and thus it has high thermal conductivity. Additionally, heat is transferred in an in-plane direction, i.e., in a direction parallel to an XY plane and thus the entire surface of the first electrode 920 may be at an approximately equal temperature. The first electrode 920 is approximately disposed on the entire surface of the temperature sensor, and thus the entire polymer layer 130 is at an approximately equal temperature. For this reason, capacitance values obtained through the multiple second electrodes 940 are approximately equal. In this case, temperatures detected by the temperature sensor as illustrated in FIGS. 15A to 15C, are approximately equal, when the plurality of second electrodes 940 are disposed. As a result, temperature distribution of each region of a surface of the object 10 could not be measured.

On the other hand, with respect to the temperature sensor according to the present embodiment, heat from a given object 10 is transferred to the first electrodes 220 via the first insulating layer 110, as illustrated by dashed arrows of FIGS. 14B and 14C. The first electrodes 220 are each formed of copper and thus have high thermal conductivity. In such a manner, the first electrodes 220 are separately disposed in respective regions, and thus temperature of each first electrode 220 corresponds to temperature of a given region where each first electrode 220 is disposed. Thereby, temperature of the polymer layer 130 corresponds to temperature of a given region of each first electrode 220, and thus capacitance values as obtained are detected as values indicating the temperature distribution of a surface of a given object 10. Accordingly, with respect to the temperature sensor according to the present embodiment illustrated in FIGS. 14A to 14C, temperature distribution of a surface of a given object 10 can be measured for regions where the respective first electrodes 220 are disposed.

Note that other configurations are the same as configurations that have been described in the first embodiment.

Third Embodiment

Hereafter, a temperature sensor according to a third embodiment will be described. In the present embodiment, first electrodes and second electrodes are not each formed in a strip shape. The temperature sensor includes first electrodes and second electrodes each of which includes multiple island regions and connection regions, each of which connects adjacent island regions. Where, the island regions are used to measure temperature.

Figure 16:
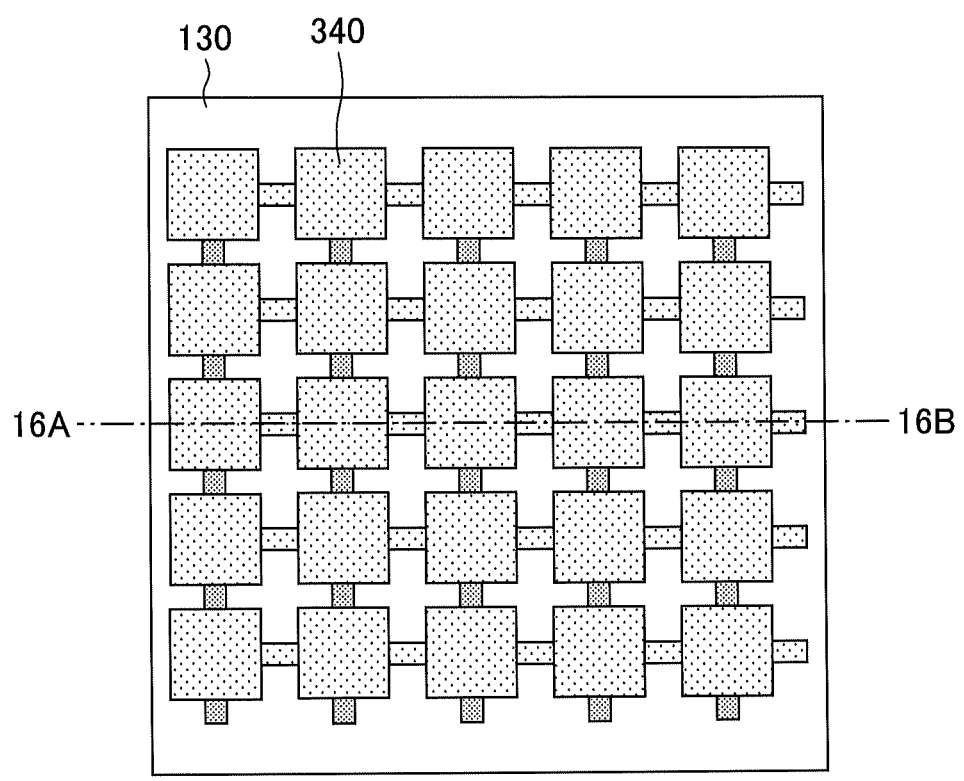
FIG. 16 is a diagram illustrating an example of a temperature sensor according to a third embodiment.
Figure 16:
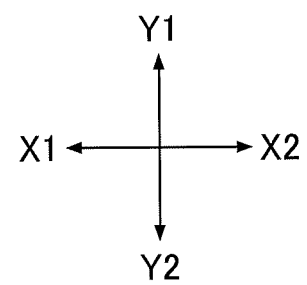
Figure 17A:
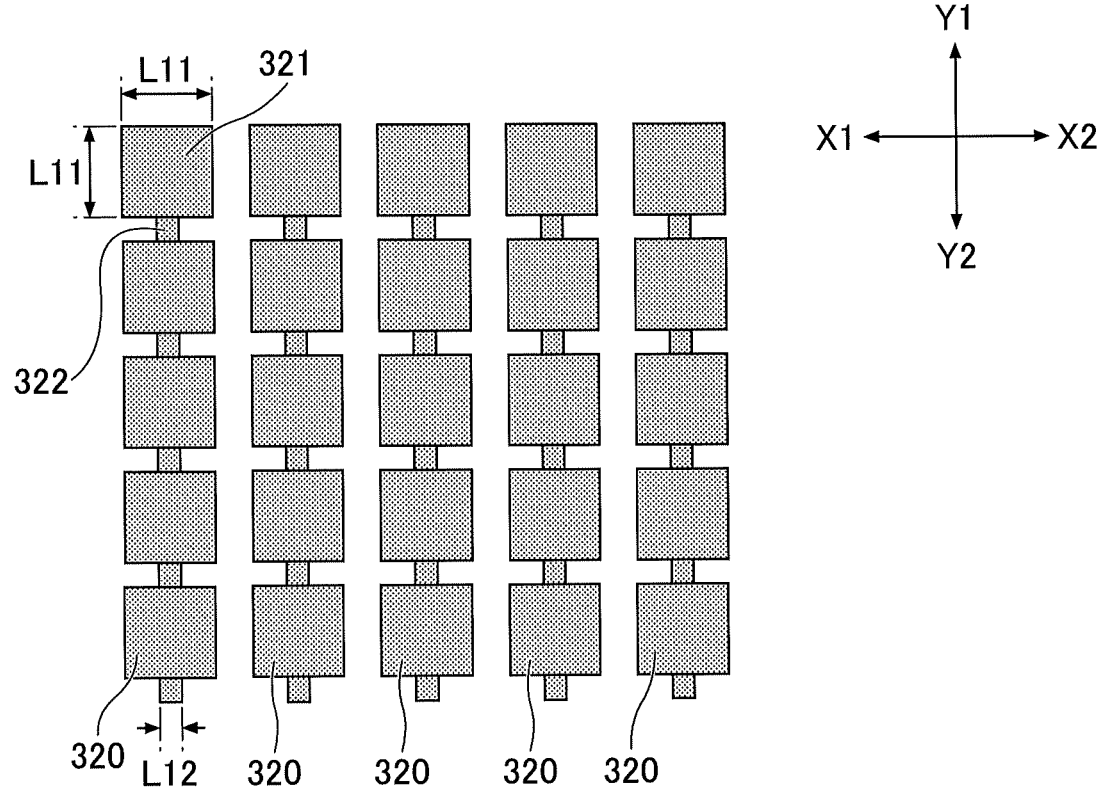
FIG. 17A is a diagram (1) illustrating an example of electrodes used in the temperature sensor according to the third embodiment.
Figure 17B:
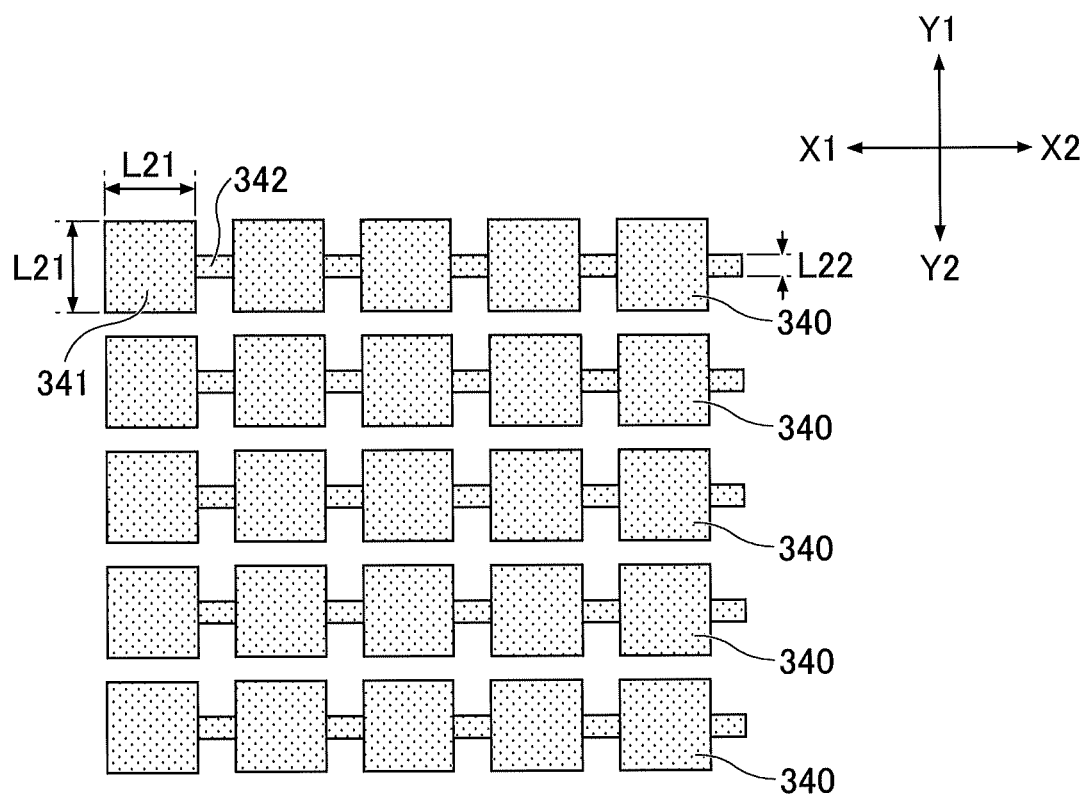
FIG. 17B is a diagram (2) illustrating an example of electrodes used in the temperature sensor according to the third embodiment.
Figure 18:
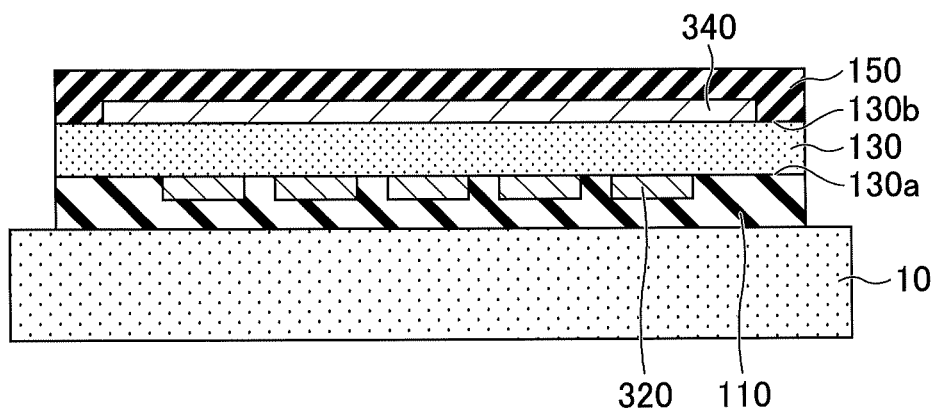
FIG. 18 is a cross-sectional view of the temperature sensor according to the third embodiment.
Figure 18:
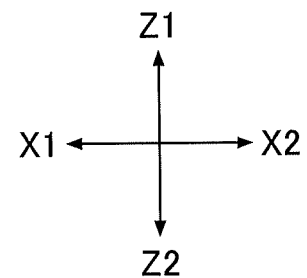

FIG. 16 is a top view of electrode arrangement of the temperature sensor according to the present embodiment. FIG. 17A is a diagram illustrating an example of arrangement of first electrodes 320. FIG. 17B is a diagram illustrating an example of arrangement of second electrodes 340. FIG. 18 is a cross-sectional view taken along the dashed-dotted line 16A-16B in FIG. 16.

As illustrated in FIGS. 16, 17A, and 17B, for the temperature sensor according to the present embodiment, with respect to each first electrode 320, multiple island regions 321 are each connected to one or more connection regions 322. With respect to each second electrode 340, multiple island regions 341 are each connected to one or more connection regions 342.

In the present embodiment, the temperature sensor includes a first insulating layer 110, the first electrodes 320; a polymer layer 130; the second electrodes 340; a second insulating layer 150; and the like. These components are each laminated toward a Z1 direction from a Z2 direction.

In the present embodiment, as illustrated in FIG. 17A, each first electrode 320 includes the multiple island regions 321 each of which has an approximately square shape, and includes the connection regions 322 that are each connected to adjacent island regions 321 in a Y1-Y2 direction. Each island region 321 of a given first electrode 320 has an approximate square shape having a length L11 of about 5 mm for each side. Adjacent island regions 321 in the Y1-Y2 direction are connected by a given connection region 322. Each connection region 322 has a width L12 that is smaller than a side length L11 of each island region 321. The width L12 is set to about 100 μm. With the width L12 of each connection region 322 being decreased, thermal conduction is decreased in a given connection region 322. Thereby, thermal resolution in adjacent islands 321 can be improved. In the example of FIG. 17A, in the Y1-Y2 direction, adjacent islands 321 are connected by a given connection region 322, and five first electrodes 320 each extending in the Y1-Y2 direction are disposed.

As illustrated in FIG. 17B, each second electrode 340 includes the multiple island regions 341 each of which has an approximately square shape, and includes the connection regions 342 that are each connected to adjacent island regions 321 in an X1-X2 direction. Each island region 341 of a given second electrode 340 has an approximate square shape having a length L21 of about 5 mm for each side. Adjacent island regions 341 in the X1-X2 direction are connected by a given connection region 342. Each connection region 342 has a width L22 that is smaller than a side length L21 of each island region 341. The width L22 is set to about 100 μm. With the width L22 of each connection region 342 being decreased, thermal conduction is decreased in a given connection region 342. Thereby, thermal resolution in adjacent islands 341 can be improved. In the example of FIG. 17B, in the X1-X2 direction, adjacent islands 341 are connected by a given connection region 342, and five first electrodes 320 each extending in the X1-X2 direction are disposed.

In the present embodiment, island regions 321 of a given first electrode 320 are arranged so as to overlap with respective island regions 341 of a given second electrode 340. In this case, with respect to the X1-X2 direction and the Y1-Y2 direction, locations at which island regions 321 of a given first electrode 320 are disposed, correspond to respective locations at which island regions 341 of a given second electrode 340 are disposed. Further, with respect to the Z1-Z2 direction, island regions 321 of a given first electrode 320 overlap with respective island regions 341 of a given second electrode 340. In the present embodiment, capacitance of each region where the polymer layer 130 is sandwiched by a given island region 321 of a first electrode 320 and a given island region 341 of a second electrode 340, is detected. Thereby, temperature of each region can be detected.

As described above, connection regions 322 each having a decreased width are formed in each first electrode 320, and connection regions 342 each having a decreased width are formed in each second electrode 340. Thereby, thermal interference between regions used in detecting capacitance can be suppressed. Accordingly, temperature distribution of a surface of a given object 10 can be accurately measured.

FIG. 19 is a diagram schematically illustrating a measured result of temperature distribution of a surface of an object 10 used in another temperature sensor according to the present embodiment. Where the number of first electrodes is 10; the number of second electrodes is 10; each first electrode includes 10 island regions; and each second electrode 340 includes 10 island regions. Other configurations are the same as those described in the third embodiment.

Figure 20:
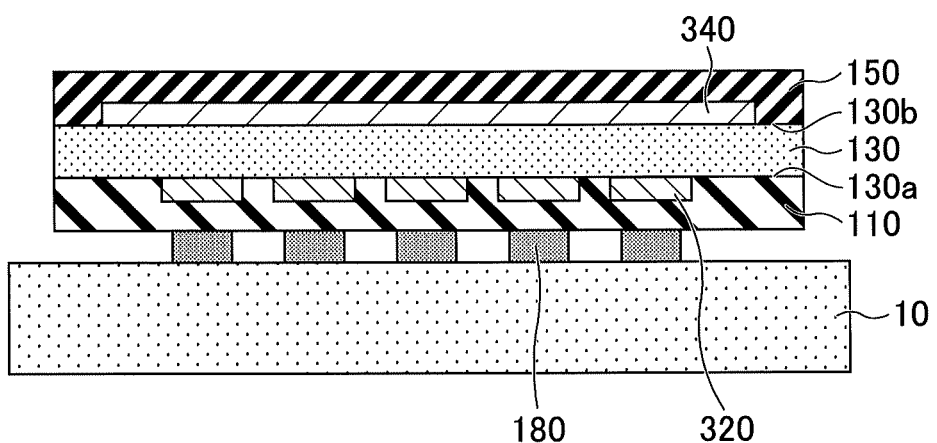
FIG. 20 is a cross-sectional view of a temperature sensor in a first modification of the third embodiment.
Figure 20:
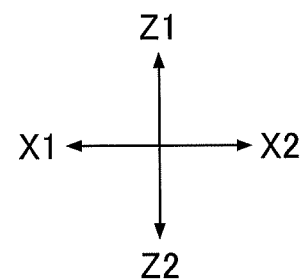

In a first modification of the third embodiment, a temperature sensor further includes adhesive layers 180 on a surface of a first insulating layer 110, as illustrated in FIG. 20. The adhesive layers 180 allow for close contact with a surface of an object 10. In this case, each adhesive layer 180 has dimensions that are the same as a region where a given island region 321 of a first electrode 320 overlaps with a given island region 341 of a second electrode 340, or, the adhesive layer 180 has dimensions that are smaller than a region where a given island region 321 of a first electrode 320 overlaps with a given island region 341 of a second electrode 340. Thereby, thermal interference can be further suppressed.

Note that other configurations are the same as configurations that have been described in the first embodiment and modifications.

The embodiments and modifications have been described above in detail. However, the present disclosure is not limited to any specific embodiment, and various modifications and alternatives can be made within a scope in the claims.

What is claimed is:

1. A temperature sensor comprising:
 a polymer layer, a relative permittivity of the polymer layer varying in accordance with temperature, and the polymer layer being formed of a flexible material, at least one first electrode disposed on one surface of the polymer layer;

at least one second electrode disposed on another surface of the polymer layer;

a measuring unit configured to measure a temperature of an object based on capacitance of at least one region between the first electrode and the second electrode that are separated by the polymer layer, the first electrode being closer than the second electrode to a surface of the object that contacts the temperature sensor; and a first insulating layer that covers the first electrode, the first insulating layer having a through-plane thermal conductivity greater than an in-plane thermal conductivity, the through-plane thermal conductivity being a thermal conductivity in a through-plane direction of the first insulating layer, and the in-plane thermal conductivity being a thermal conductivity in an in-plane direction of the first insulating layer perpendicular to the through-plane direction.

2. The temperature sensor according to claim 1, further comprising a second insulating layer that covers the second electrode, wherein the first insulating layer has a through-plane thermal conductivity greater than a through-plane thermal conductivity of the second insulating layer.

3. The temperature sensor according to claim 2, further comprising a third electrode disposed on the second insulating layer.

4. The temperature sensor according to claim 1, further comprising an adhesive layer for close contact with a surface of the object.

5. The temperature sensor according to claim 1, wherein the at least one first electrode is a plurality of first electrodes, and wherein the measuring unit is configured to measure temperature distribution of the object, based on capacitance of the at least one region being multiple regions between the first electrode and the second electrode that are separated by the polymer layer.

6. The temperature sensor according to claim 5, wherein the polymer layer has a thickness that is smaller than spacing between adjacent first electrodes.

7. The temperature sensor according to claim 1, wherein the at least one first electrode is a plurality of first electrodes, wherein the at least one second electrode is a plurality of second electrodes, wherein a direction in which each first electrode extends is approximately perpendicular to a direction in which each second electrode extends, and wherein the measuring unit is configured to measure temperature distribution of the object, based on capacitance of the at least one region being multiple regions between the first electrode and the second electrode that are separated by the polymer layer.

8. The temperature sensor according to claim 1, wherein the polymer layer includes polyimide, PET, or PEN.

9. The temperature sensor according to claim 1, wherein the capacitance indicates a value obtained with an alternating voltage being applied across the first electrode and the second electrode.

10. The temperature sensor according to claim 1, wherein the polymer layer has a thickness of 50 μm or smaller.

11. A temperature sensor comprising:

a polymer layer, a relative permittivity of the polymer layer varying in accordance with temperature, the polymer layer being formed of a flexible material;

at least one first electrode disposed on one surface of the polymer layer;

at least one second electrode disposed on another surface of the polymer layer; and a first insulating layer that covers the first electrode, wherein the first insulating layer has a through-plane thermal conductivity greater than an in-plane thermal conductivity, the through-plane thermal conductivity being a thermal conductivity in a through-plane direction of the first insulating layer, and the in-plane thermal conductivity being a thermal conductivity in an in-plane direction of the first insulating layer perpendicular to the through-plane direction.

\* \* \* \* \*